United States Patent
Charania et al.

(10) Patent No.: US 9,405,774 B2
(45) Date of Patent: Aug. 2, 2016

(54) AUTOMATED IMAGE ORGANIZATION TECHNIQUES

(71) Applicant: Verizon Patent and Licensing Inc., Arlington, VA (US)

(72) Inventors: Rahim Charania, Euless, TX (US); Joseph E. Berger, Jr., Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/516,946

(22) Filed: Oct. 17, 2014

(65) Prior Publication Data

US 2016/0110355 A1    Apr. 21, 2016

(51) Int. Cl.
  *G06K 9/62*  (2006.01)
  *G06F 17/30*  (2006.01)

(52) U.S. Cl.
  CPC ...... *G06F 17/3028* (2013.01); *G06F 17/30253* (2013.01); *G06F 17/30256* (2013.01); *G06F 17/30265* (2013.01); *G06F 17/30268* (2013.01)

(58) Field of Classification Search
  USPC .......... 382/170, 209, 224, 278, 305; 358/537, 358/426.05, 452
  See application file for complete search history.

(56) References Cited

U.S. PATENT DOCUMENTS

| | | | | | |
|---|---|---|---|---|---|
| 7,349,010 B2 * | 3/2008 | Bryant | ............... | H04N 1/00185 | 348/207.1 |
| 7,369,164 B2 * | 5/2008 | Parulski | ............... | G06F 17/3028 | 348/231.2 |
| 7,443,418 B2 * | 10/2008 | Bryant | ................... | G06Q 40/04 | 348/207.1 |
| 7,460,781 B2 * | 12/2008 | Kanai | ................ | H04N 5/23203 | 348/211.3 |
| 7,519,200 B2 * | 4/2009 | Gokturk | ............ | G06F 17/30253 | 382/118 |
| 7,668,405 B2 * | 2/2010 | Gallagher | ......... | G06F 17/30244 | 382/305 |
| 8,270,684 B2 * | 9/2012 | Kiyohara | .......... | G06F 17/30029 | 382/118 |
| 8,599,275 B2 * | 12/2013 | Kashiwa | .............. | G11B 27/034 | 348/211.3 |
| 8,634,603 B2 * | 1/2014 | Kiyohara | .......... | G06F 17/30029 | 382/118 |

OTHER PUBLICATIONS

Apple, "iPhoto '11: Create or change a Smart Album," (available at http://support.apple.com/kb/ph2389, visited Jun. 16, 2014).

* cited by examiner

*Primary Examiner* — Yosef Kassa

(57) ABSTRACT

A device may receive multiple images captured by a user device; and determine an event based on at least one of: attributes of the multiple images, information regarding a user associated with the multiple images, or information regarding the user device. The device may determine attributes of the event; identify, based on the attributes of the multiple the images and the attributes of the event, particular images, of the multiple images, associated with the event; generate a digital image album that includes one or more of the particular images; and output the digital image album.

20 Claims, 9 Drawing Sheets

400 →

| Attribute | Value | Weighting Factor |
|---|---|---|
| Edited/Enhanced | 20 | 2 |
| Image contents = Family | 30 | 5 |
| Image quality = Blurry | -30 | 3 |
| Duplicate | -200 | 8 |
| Near-Duplicate | -100 | 8 |
| Outlier | -200 | 9 |
| User rating = High | 20 | 5 |
| User rating = Medium | 10 | 5 |
| User rating = Low | -10 | 5 |

Fig. 4

AUTOMATED IMAGE ORGANIZATION TECHNIQUES

BACKGROUND

Digital image libraries may store images captured by users via user devices. In order to organize a group of images in a digital image library, a user may select particular images to place in a digital album. For example, a user may select "favorite" images associated with a particular event, geographic location, or containing particular individuals.

BRIEF DESCRIPTION OF THE DRAWINGS

FIG. 4 illustrates an example data structure that may store information identifying values for corresponding attributes of an image;

DETAILED DESCRIPTION OF THE PREFERRED EMBODIMENTS

The following detailed description refers to the accompanying drawings. The same reference numbers in different drawings may identify the same or similar elements.

Manually sorting through an image library can be time consuming and tedious, particularly when the image library contains a substantial quantity of images. Systems and/or methods, as described herein, may automatically identify an event, associated with a group of images in an image library, and generate an album containing images associated with the event. In some implementations, the album may include a subset of images associated with the event. For example, duplicate images, near-duplicate images, and/or low-quality images may be excluded from the album. As a result, images may be automatically organized by event, thereby saving a user time in relation to when the user is required to manually organize the images.

Figure 1:
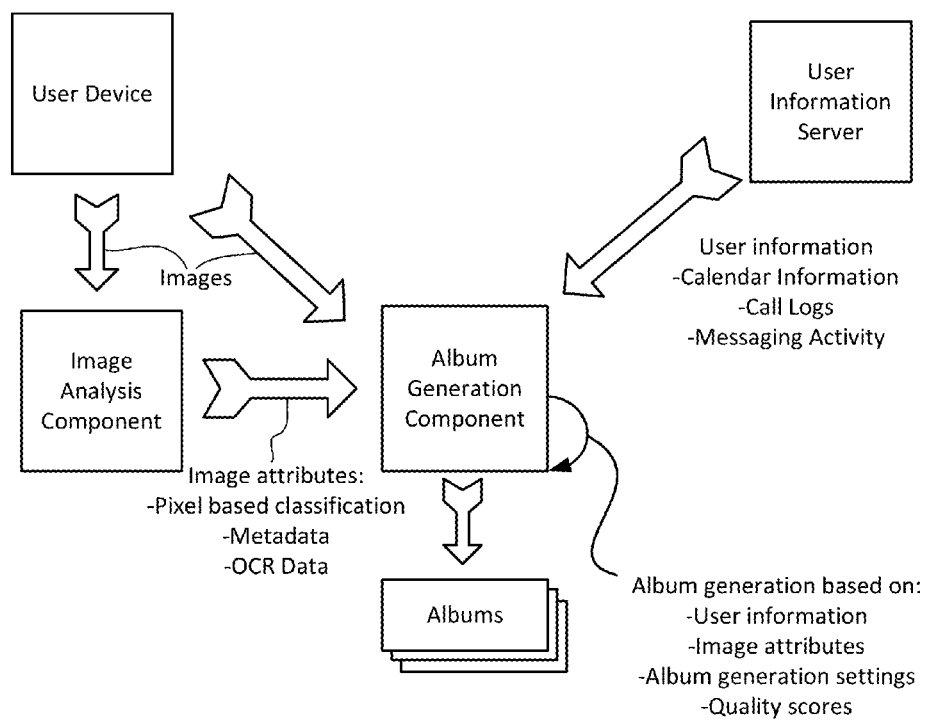
FIG. 1 illustrates an example overview of an implementation described herein.

FIG. 1 illustrates an example overview of an implementation described herein. As shown in FIG. 1, an album generation component may receive images (e.g., from a user device). The album generation component may, for example, include an application running on the user device and/or may be implemented on an external device. An image analysis component may also receive a copy of the images. The image analysis component may also include an application running on the user device and/or may be implemented on an external device. The image analysis component may determine attributes associated with the images, such as object recognition information (e.g., information identifying objects in the image, individuals in the image via facial recognition techniques, and/or some other contents of the image). Additionally, or alternatively, the image analysis component may determine metadata of the images (e.g., geographic locations associated with the image based on geotags included in the images, dates and times in which the images were created, user ratings of the images, etc.). Additionally, or alternatively, the image analysis component may identify text in the images using optical character recognition (OCR) techniques. Additionally, or alternatively, the image analysis component may determine some other attribute of the images.

As further shown in FIG. 1, the album generation component may receive information regarding the attributes of the images (e.g., as identified by the image analysis component), in addition to information regarding a user associated with the images (e.g., calendar information for the user, call logs associated with the user, messaging activity associated with the user, etc.). Based on receiving the images, the image attributes, and/or the user information, the album generation component may generate albums containing the received images. In some implementations, the album generation component may generate an album by identifying an event based on the user information and/or the image attributes. As an example, the album generation component may identify an event based on the calendar information (e.g., an event identifying a family vacation, a birthday, a wedding, etc.). Additionally, or alternatively, the album generation component may identify an event when a group of images include geotags identifying a geographic location other than a home location of the user. Additionally, or alternatively, the album generation component may identify an event based on information that identifies a geographic location from where telephone calls were made and/or received (e.g., a geographic location other than a home location of the user). Additionally, or alternatively, the album generation component may identify an event based on messaging activity that indicates an event (e.g., the contents of the message indicate an event).

Based on identifying an event, the album generation component may identify images associated with the event. For example, if the event is identified based on calendar information, the album generation component may identify images whose metadata identifies dates corresponding to dates of the event as identified in the calendar information. As an example, assume that the calendar information indicates that a family vacation took place between the dates of Jun. 1, 2014 and Jun. 8, 2014. Further, assume that the calendar information indicates a location of the event (e.g., Orlando, Fla.). Given these assumptions, the album generation component may identify the event (e.g., the event "Family Vacation"), and identify images corresponding to the event based on the attributes of the images. For example, the album generation component may identify images having geotags corresponding to the geographic location of Orlando, Fla., and having metadata identifying that the images were captured on dates from Jun. 1, 2014 to Jun. 8, 2014. Once the album generation component has identified images corresponding to the event, the album generation component may select a subset of these images, and create an album including the subset of the images. For example, the album may exclude duplicate images, near-duplicate images, images of relatively low quality, etc.

Figure 2:
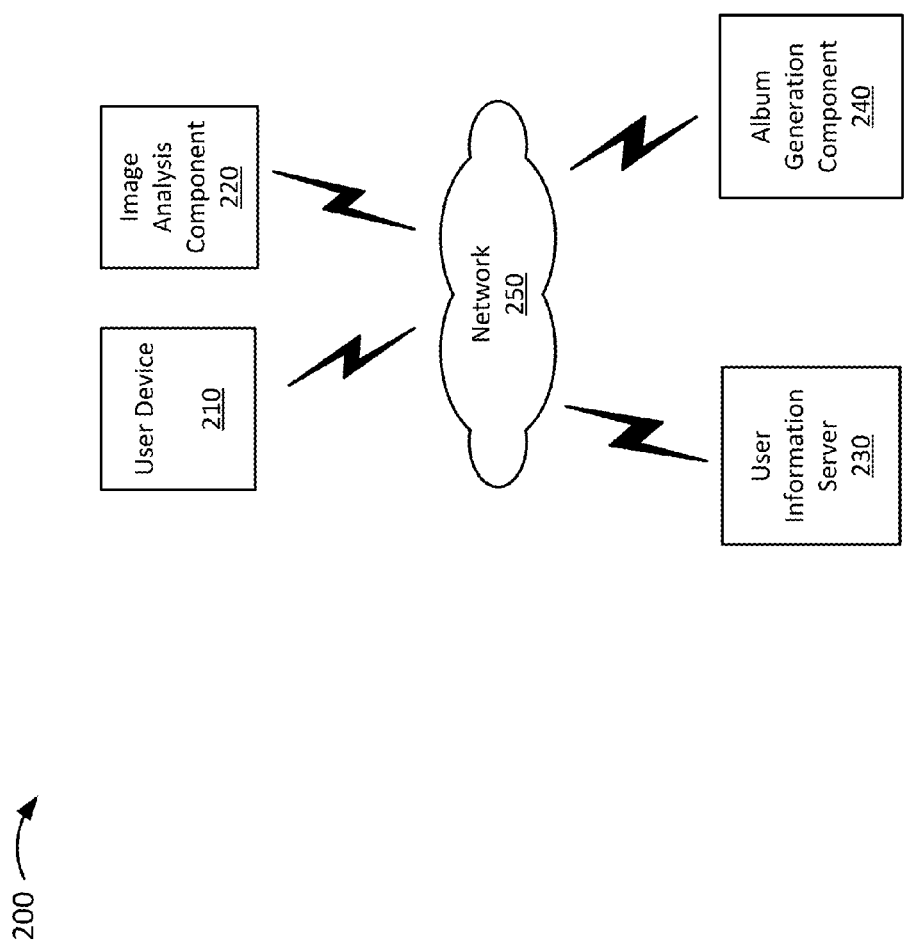
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, image analysis component 220, user information server 230, album generation component 240, and network 250.

User device 210 may include a device capable of communicating via a network, such as network 250. For example, user device 210 may correspond to a mobile communication device (e.g., a smart phone or a personal digital assistant (PDA)), a portable computer device (e.g., a laptop or a tablet computer), a camera device, a gaming device, a desktop computing device, and/or some other type of computing device. In some implementations, user device 210 may be used to capture images, and output images to image analysis component 220 and/or album generation component 240. When capturing an image, user device 210 may associate a geotag and/or metadata with the image. In some implementations, user device 210 may implement the functions of image analysis component 220 and/or album generation component 240. For example, one user device 210 may capture images, and output the images to another user device 210 that performs the functions of image analysis component 220 and/or album generation component 240. Alternatively, a single user device 210 may capture images and perform the functions of image analysis component 220 and/or album generation component 240.

Image analysis component 220 may include one or more computing devices, such as a server device or a collection of server devices. Additionally, or alternatively, image analysis component 220 may be implemented partially or entirely by hardware circuitry and/or processing logic of user device 210. In some implementations, image analysis component 220 may receive an image from user device 210, and may identify attributes associated with the image. For example, image analysis component 220 may identify attributes corresponding to metadata associated with the image (e.g., information identifying a date/time in which the image was captured, a type of camera used to capture the image, etc.). Additionally, or alternatively, image analysis component 220 may identify attributes corresponding to a geographic location associated with the image (e.g., based on a geotag associated with the image). Additionally, or alternatively, image analysis component 220 may identify attributes corresponding to object recognition information associated with the image (e.g., objects pictured in the image, individuals pictured in the image based on facial recognition techniques, text pictured in the image based on OCR data, etc.). Additionally, or alternatively, image analysis component 220 may identify some other attribute associated with the image (e.g., resolution, file size, etc.). Image analysis component 220 may output information regarding the attributes to album generation component 240.

User information server 230 may include one or more computing devices, such as a server device or a collection of server devices. In some implementations, user information server 230 may store information regarding user device 210 and/or information regarding a user of user device 210. For example, user information server 230 may store calling activity of user device 210, messaging activity of user device 210, calendar information regarding a user of user device 210, a user profile of the user (e.g., information relating to the user's interests), and/or some other information regarding user device 210 and/or the user of user device 210. In some implementations, user information server 230 may receive calling activity, messaging activity, and/or some other information regarding the user from one or more devices of a cellular network associated with user device 210 (e.g., a call service control function (CSCF) server, a Home Subscriber Server (HSS), or the like). In some implementations, the calling activity may identify a geographic location of user device 210 when placing or receiving calls. In some implementations, user information server 230 may receive calendar information from a calendar service to which the user device is subscribed. In some implementations, user information server 230 may output this information to album generation component 240.

Album generation component 240 may include one or more computing devices, such as a server device or a collection of server devices. Additionally, or alternatively, album generation component 240 may be implemented partially or entirely by hardware circuitry and/or processing logic of user device 210. In some implementations, album generation component 240 may receive images from user device 210, image attribute information from image analysis component 220, and/or user information from user information server 230. Based on receiving the images, image attribute information, and/or the user information, album generation component 240 may identify an event, identify images associated with the event, and generate an album including a subset of the images. As described above, album generation component 240 may identify the event based on user information and/or image attribute information. In some implementations, album generation component 240 may score image as associated with the event, and exclude images from the album that are below a particular score. As described in greater detail below with respect to FIG. 3, album generation component 240 may score images based on image attributes. The scores may be used to select a subset of images that should be included in an album.

Network 250 may include one or more wired and/or wireless networks. For example, network 250 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment 200 is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
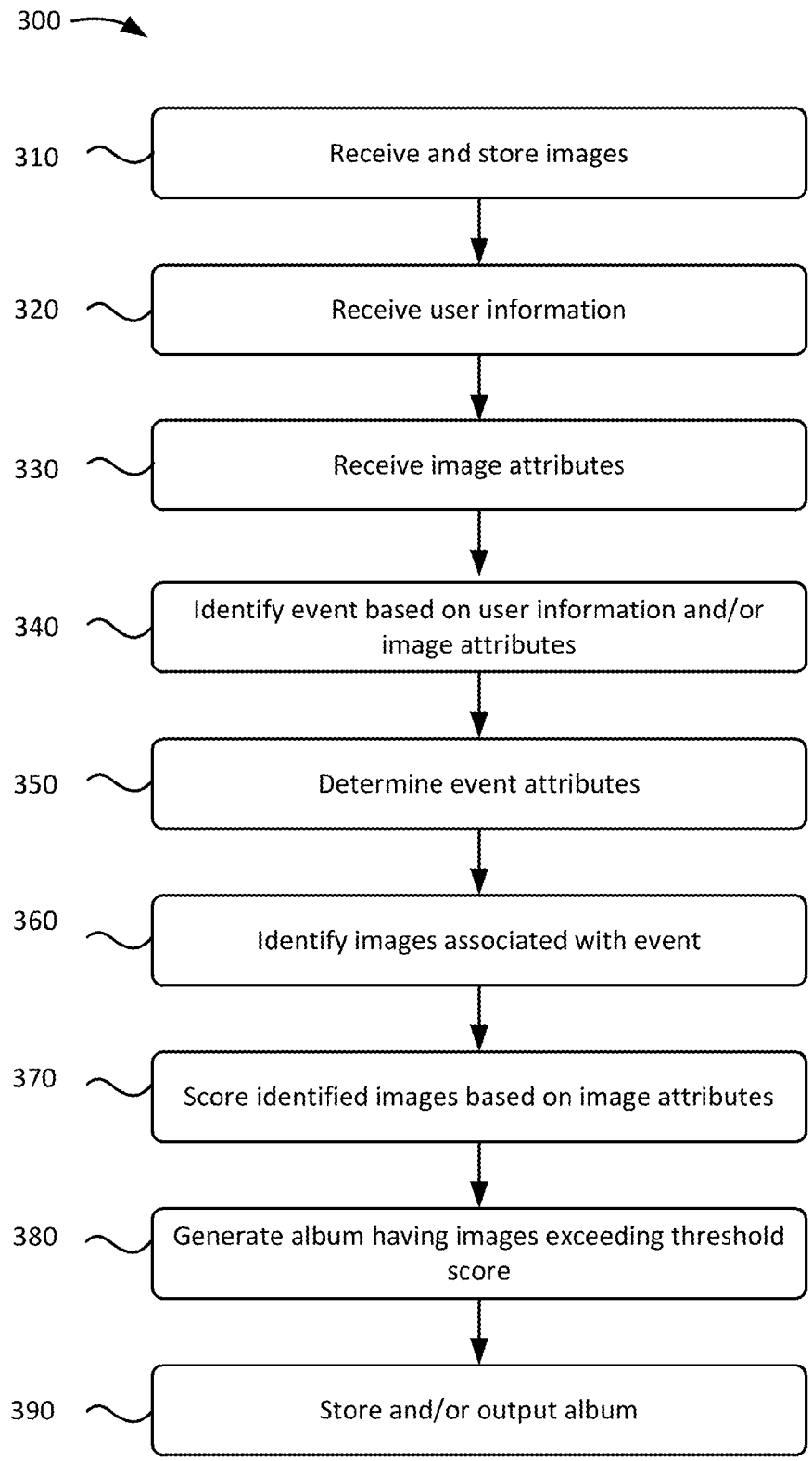
FIG. 3 illustrates a flowchart of an example process for automatically generating an album associated with a particular event.

FIG. 3 illustrates a flowchart of an example process 300 for automatically generating an album associated with a particular event. In some implementations, process 300 may be performed by album generation component 240. In some implementations, some or all of blocks of process 300 may be performed by one or more other devices.

As shown in FIG. 3, process 300 may include receiving and storing images (block 310). For example, album generation component 240 may receive images from user device 210, and may store the received images. In some implementations, album generation component 240 may receive the images from user device 210 as images are captured using user device 210. Additionally, or alternatively, album generation component 240 may intermittently or periodically receive the images from user device 210. For example, album generation component 240 may receive images from user device 210 at off-peak times in order to reduce network congestion in relation to when images are received during peak times. In some implementations, album generation component 240 may receive images from image analysis component 220 and not from user device 210. In some implementations, album generation component 240 may receive the images from user device 210 when a user of user device 210 manually imports images into an image viewing application associated with album generation component 240.

Process 300 may also include receiving user information (block 320). For example, album generation component 240 may receive user information from user information server 230. In some implementations, the user information may include calling history information for user device 210, messaging activity of user device 210, calendar or event information relating to a user of user device 210, user profile information of the user, etc. In some implementations, the user profile information may identify the user's interests, usage habits of user device 210 (e.g., web browsing history, application usage patterns, etc.), and/or some other information regarding the user. As described in greater detail below, the user profile information may be used to score an image (e.g., images of relatively higher interest to the user may be scored relatively higher than images of relatively lower interest to the user, as determined by the user profile information).

Process 300 may further include receiving image attributes (block 330). For example, album generation component 240 may receive image attributes, associated with the received images, from image analysis component 220. In some implementations, image analysis component 220 may determine the image attributes after receiving the images from user device 210. For example, image analysis component 220 may determine attributes for an image relating to metadata associated with the image, object recognition information associated with the image, geotags associated with the images, a type of camera used to capture the image (e.g., a model of the camera, a "front-facing" camera, a "rear-facing" camera, etc.), and/or some other attribute associated with the images. In some implementations, image analysis component 220 may output, to album generation component 240, the images in addition to the image attributes. For example, in some implementations, album generation component 240 may not receive the images from user device 210, but may receive the images from image analysis component 220 in addition to the image attributes.

Process 300 may further include identifying an event based on the user information and/or the image attributes (block 340). For example, album generation component 240 may identify an event based on the user information and/or the image attributes. As an example, album generation component 240 may identify an event based on calendar information associated with the user (e.g., a calendar entry entitled "Family Vacation").

In some implementations, album generation component 240 may identify an event based on image attributes. For example, album generation component 240 may identify an event when a group of images are captured by user device 210 and are associated with a geographic location that is different from a home location of the user. In some implementations, album generation component 240 may determine the geographic location of the images based on geotags associated with the images. Additionally, or alternatively, album generation component 240 may use other technique to identify a geographic location associated with the image. For example, album generation component 240 may identify the geographic location associated with the image based on calling activity of user device 210. As an example, assume that the calling activity of user device 210 indicates that user device 210 was located in the geographic location of Orlando, Fla. when telephone calls were received and/or placed. Further, assume that the image was captured by user device 210 around the time that the telephone calls were received and/or placed by user device 210. Given these assumptions, album generation component 240 may determine that the image is associated with the geographic location of Orlando, Fla.

In some implementations, album generation component 240 may identify the geographic location of the image based on geographic location information received from a social media application. For example, assume that a user of user device 210 provides information regarding the location of user device 210 via the social media application (e.g., using a "check in" process). Further, assume that the image was captured around the same time that the geographic location was captured. Given these assumptions, album generation component 240 may associate the geographic location information, provided by the user via the social media application, with the image. The user may opt in to allow access to the user's social media profile, and may opt out to remove access to the profile.

In some implementations, album generation component 240 may identify the geographic location of the image based on object recognition information and/or OCR data associated with the image. For example, album generation component 240 may use object recognition techniques to identifying an object (e.g., a landmark) in the image that corresponds to a geographic location. Additionally, or alternatively, album generation component 240 may identify the geographic location of the image based on OCR data that indicates the geographic location of the image. For example, if the image includes a sign having text, such as "Welcome to Orlando," album generation component 240 may determine that the image is associated with the geographic location of Orlando.

In some implementations, album generation component 240 may identify an event based on the calling activity of user device 210 (e.g., when the calling activity indicates that user device 210 was used to make and/or receive telephone calls when located in a different geographic location than a home location of the user). For example, album generation component 240 may identify an event when greater than a threshold quantity of telephone calls were placed and/or received from a geographic location other than the home location of the user within a threshold period of time. In some implementations, album generation component 240 may identify an event based on a geographic location associated with telephone calls placed and/or received by user device 210 (e.g., telephone calls associated with telephone numbers having area codes outside of a home location associated with the user). In some implementations, album generation component 240 may identify an event based on messaging activity of user device 210. For example, album generation component 240 may identify an event when a group of images are sent as messages (e.g., multimedia service (MMS) messages, e-mail messages, etc.).

In some implementations, album generation component 240 may identify an event based on some other information. For example, an event may correspond to the importing of images by album generation component 240 from user device 210. Additionally, or alternatively, an event may be based on a current date. For example, as described in greater detail below, a "Flashback" album may be generated to include images associated with a current day in previous years. Similarly, a "Memories" album may be generated to include images from previous weeks, months, or years from a current date.

Process 300 may further include determining event attributes (block 350). For example, album generation component 240 may determine event attributes associated with the event. In some implementations, album generation component 240 may determine event attributes, such as a title of the event, a start date/time, an end date/time, a geographic location associated with the event, individuals associated with the event, and/or some other attribute of the event. As an example, album generation component 240 may determine the title of the event, start date/time, end date/time, and/or the geographic location associated with the event based on information included in a calendar entry.

As another example, album generation component 240 may determine attributes of an event identified based on calling activity. For example, assume that an event is identified based on calling activity identifying that telephone calls were placed and/or received when user device 210 was located at the geographic location of Orlando, Fla. during the dates of Jun. 1, 2014, to Jun. 8, 2014. Given this assumption, album generation component 240 may determine that the event is associated with the geographic location of Orlando, Fla. Further, album generation component 240 may determine an event title, such as "Trip to Orlando, Fla. —Jun. 1, 2014-Jun. 8, 2014." Further, album generation component 240 may determine start and end dates for the event of Jun. 1, 2014 and Jun. 8, 2014.

As another example, album generation component 240 may determine attributes of an event identified when a group of images are captured by user device 210 and when the group of images is associated with a geographic location that is other than a home location of the user of user device 210 (e.g., the geographic location of Orlando, Fla.). For example, album generation component 240 may determine that the event is associated with the geographic location of Orlando, Fla., and that the event is associated with start and end dates corresponding to metadata in the images identified dates in which the images were captured. Further, album generation component 240 may determine an event title, such as "Trip to Orlando, Fla."

As another example, album generation component 240 may determine attributes of an event identified based on messaging activity (e.g., messaging activity identifying that a message having one or more images has been sent). For example, album generation component 240 may determine an event attribute that identifies recipients of the message. As an example, assume that the recipients include family members of the sender of the message. Given this assumption, album generation component 240 may determine an event title, such as "Images sent to family."

Process 300 may also include identifying images associated with the event (block 360). For example, album generation component 240 may identify images associated with the event based on the image attribute information and the event attribute information. As an example, assume that album generation component 240 identifies an event attributes of the event based on calendar information (e.g., calendar information identifying a "Family Vacation" event from the dates of Jun. 1, 2014-Jun. 8, 2014, at Orlando, Fla.). Given this assumption, album generation component 240 may identify images (e.g., based on image attribute information) associated with the geographic location of Orlando, Fla., and having metadata identifying created dates from Jun. 1, 2014 to Jun. 8, 2014.

As another example, assume that album generation component 240 identifies an event based on calling history information. Further, assume that album generation component 240 determines attributes of the event. For example, album generation component 240 may determine that the event is associated with the geographic location of Orlando, Fla., and has start and end dates of Jun. 1, 2014 and Jun. 8, 2014. Given these assumptions, album generation component 240 may identify images having the same attributes as the event (e.g., images associated with the geographic location of Orlando, Fla., and having metadata identifying created dates from Jun. 1, 2014 to Jun. 8, 2014).

As another example, assume that album generation component 240 identifies an event corresponding to a current date (e.g., a date of Jun. 1, 2014). Given this assumption, album generation component 240 may identify images having metadata identifying created dates (or "taken on" dates) of June 1 from previous years.

Process 300 may further include scoring the identified images based on image attributes (block 370). For example, album generation component 240 may score the identified images associated with the determined event to identify images that should be included in an album corresponding to the event. For a particular image, a value may be determined for each attribute of the image, and the values may be combined to determine a score for the image. The score for an image may relate to a measure of quality and/or importance of the image.

In some implementations, an attribute may relate to a measure of quality of an image (e.g., a resolution, a measure of clarity, etc.). For example, the value of an attribute related to the clarity of an image (e.g., "clarity" attribute) may be proportional to the clarity (e.g., blurry images having relatively lower clarity may have a relatively lower value for the "clarity" attribute). In some implementations, the value of the "clarity" attribute may not be negatively affected for an image when a filter and/or an effect are applied to blur the image. In some implementations, attributes may relate to whether an image is a duplicate or near-duplicate of another image. Attributes relating to whether an image is a duplicates or near-duplicate images may be assigned with a negative value in order to lower the score of duplicate and near-duplicate images. In some implementations, attributes relating to whether an image is an outlier may be assigned with a negative value. For example, an outlier may correspond to an image that is the only image of its kind in a group of images (e.g., a sole image of a particular subject, such as a sole image of a parking lot or other object, which may indicate that the image was accidently captured and/or is otherwise undesirable). The attribute relating whether an image is an outlier may be assigned with a negative value since an outlier may be of less importance than other images.

In some implementations, attributes may relate to objects and/or individuals included in an image (e.g., based on object recognition techniques, facial recognition techniques, etc.). For example, a value may be assigned for images having particular individuals (e.g., family members). In some implementations, an individual may be identified in an image by comparing the image with pixel-based data identifying the individual. For example, the pixel-based data may be based on other images in which the individual is identified (e.g., tagged in a social media profile image, a contact image, or other image). The user may enhance facial recognition algorithms by manually identifying an individual in an image so that the facial recognition algorithm may apply the identification of an individual to other images. In some implementations, images having a group of individuals may be scored relatively higher than images that do not have a group of individuals. The score of an image having a number of individuals may be based on a bell curve. For example, a group of five individuals may increase the relative score of the image, whereas a group of 100 individuals may decrease the relative score (e.g., since an image having a relatively smaller group of individuals may be of greater value than an image having a relatively larger group. In some implementations, the score of an image may be proportional to the size of faces in an image.

In some implementations, the values associated with attributes may be based on user-defined preference information. For example, a user may indicate that images having particular contents (e.g., images having particular individuals) should be scored relatively higher than images that do not contain the particular contents. Another attribute may relate to whether an image has been edited by a user. The value of this attribute may be relatively higher for images that have been edited (e.g., since edited images may be of more importance than images that have not been edited). For example, the value may be positive for this attribute if the user has applied a filter and/or effect to the image, enhanced the image, cropped the image, resized the image, etc. Another attribute may relate to whether an image has been shared by a user, and a quantity of times that the image has been shared, and how the image was shared (e.g., via social media, via an MMS message, etc.). The value of this attribute may be relatively higher for images that have been shared greater than others, or may be different based on how the image was shared. Some examples attributes and corresponding values are described below with respect to FIG. 4.

In some implementations, album generation component 240 may score a particular image by combining values for each attribute associated with the particular data file. For example, album generation component 240 may add, average, subtract, multiply, and/or divide the values to obtain a score for the particular image. In some implementations, the values may be weighted.

Process 300 may further include generating an album having images exceeding a threshold score (block 380). For example, album generation component 240 may generate an album associated with the identified event, and include images in the album associated with identified event. In some implementations, album generation component 240 may include a subset of the images associated with the event. For example, album generation component 240 may include those images that exceed a threshold score. As a result, the album may include images exceeding a particular measure of quality or level and/or importance. The album may exclude images that fall below the particular measure of quality and/or importance, in addition to duplicate and/or near-duplicate images. In some implementations, the album may be generated when a threshold minimum quantity of images are associated with an event and exceed the threshold score. Also, the album may identify the attributes of the images (e.g., individuals in the images, geographic location associated with the images, etc.). In some implementations, the album may be generated when the quantity of images taken by a user have satisfied a threshold or when a rate of the quantity of images satisfies a threshold. For example, the album may be generated when 100 images have been taken by a user. As another example, the album may be generated at the end of a week when the user routinely takes a threshold quantity of images per week or per day. As another example, the album may be generated at the end of the day if the user has taken a threshold number of images in a one-day period.

Process 300 may also include storing and/or outputting the album (block 390). For example, album generation component 240 may output the album to user device 210. In some implementations, album generation component 240 may output the album as a data file that includes the images associated with the event and exceeding the threshold score. Additionally, or alternatively, album generation component 240 may output the album in the form of a webpage that includes links to the images (e.g., where each link includes a thumbnail of a corresponding image). In some implementations, album generation component 240 may output the album in the form of a message (e.g., a short message service (SMS) message, an MMS message, an e-mail message, etc.). Additionally, or alternatively, album generation component 240 may output the album in another format. Based on receiving the album, user device 210 may display an option to view the album. For example, user device 210 may display a notification that an album for an event has been generated, and may present a link to the album, a page including the images in the album, an application including the images in the album, or the like. In some implementations, the user may receive a notification when the album has been generated (e.g., via an SMS message, MMS message, e-mail message, etc.). The user may also control whether notifications should be received, and the format in which the notifications should be received.

In some implementations, a user of user device 210 may save the album in order to manually add or remove images from the album, or to save the album for future viewing. In some implementations, the images may be sorted based on the score of the images (e.g., higher scored images may be displayed first). Additionally, or alternatively, the user may select to sort the image based on image attributes (e.g., group the images based on individuals included in the image, or group the image based on a geographic location associated with images). In some implementations, the user may modify the view of album using sliders to reorder the arrangement of the images based on date/time, geographic location, individuals in the image, and/or other attributes of the images.

In some implementations, some or all of process 300 may be repeated in order to update the album. For example, album generation component 240 may periodically or intermittently update the album as new images are received by album generation component 240 (e.g., as new images are captured by user device 210 and transmitted to album generation component 240). In some implementations, album generation component 240 may update the album by receiving attribute information associated with the new images, identifying that the new images are associated with the event of the album, scoring the new images, and including, in the album, the new images that exceed a particular score.

FIG. 4 illustrates an example data structure 400 that may store information identifying values for corresponding attributes of an image. In some implementations, data structure 400 may be stored in a memory of album generation component 240. In some implementations, data structure 400 may be stored in a memory separate from, but accessible by, album generation component 240 (e.g., a "cloud" storage device). In some implementations, data structure 400 may be stored by some other device in environment 200, such as image analysis component 220 and/or user information server 230. A particular instance of data structure 400 may contain different information and/or fields than another instance of data structure 400.

Each field in data structure 400 may store information identifying attributes and corresponding values. As an example shown in FIG. 4, data structure 400 may store information identifying a value of 20 for images that have been edited or enhanced (e.g., since edited or enhanced images may indicate a higher level of importance to a user than images that have not been edited or enhanced). As another example, data structure 400 may store information identifying a value of 30 for images containing a particular individual (e.g., a family member). As another example, data structure 400 may store information identifying a value of –30 for images that are blurry. As another example, data structure 400 may store information identifying a value of –200 for images that are duplicates. As another example, data structure 400 may store information identifying a value of –100 for images that are near-duplicates. As another example, data structure 400 may store information identifying a value of –200 for images that are outliers. As another example, data structure 400 may store information identifying a fixed value of 20 for images rated as "High" by a user, a fixed value of 10 for images rated as "Medium" by the user, and a fixed value of –10 for images rated as "Low" by the user.

Information included in data structure 400 may be used to score an image associated with an event. For example, album generation component 240 may determine the attributes of the image, determine the values of each attribute (e.g., the values specified in data structure 400), and combine the values to generate a score for the image. As further shown in FIG. 4, data structure 400 may store weighting information for each attribute. For example, the attribute relating to whether an image contains a user's family member may be weighted higher than the attribute relating to whether the image was edited or enhanced. In some implementations, particular values may not apply when an image has particular attributes. For example, if a "blurry effect" has been added to an image (e.g., if a user has applied a filter that applies a blurry effect, or any filter at all), then the value for the attribute relating to blurry images may not apply. Also, values for attributes relating to duplicate or near-duplicate images may not apply to one of the duplicate or near-duplicate images (e.g., to prevent the scores of all duplicate and near-duplicate images from being adversely affected).

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible. For example, the values may be based on other attributes, such as file metadata (e.g., metadata identifying a date in which an image was created, modified, or accessed, a file size of the image, a geographic location associated with the image, a type of camera used to capture an image or video corresponding to the image, a type of lens use to capture an image or video, etc.). Additionally, or alternatively, the values may be based on whether an image was shared, a quantity of times the image was shared, a method in which the image was shared (e.g., via MMS message, via social media, etc.). In some implementations, the values and weighting factors, stored by data structure 400, may be modified by a user to adjust the behavior of automatic album generation (e.g., adjust which images may ultimately be included in an album based on image attributes).

Figure 5:
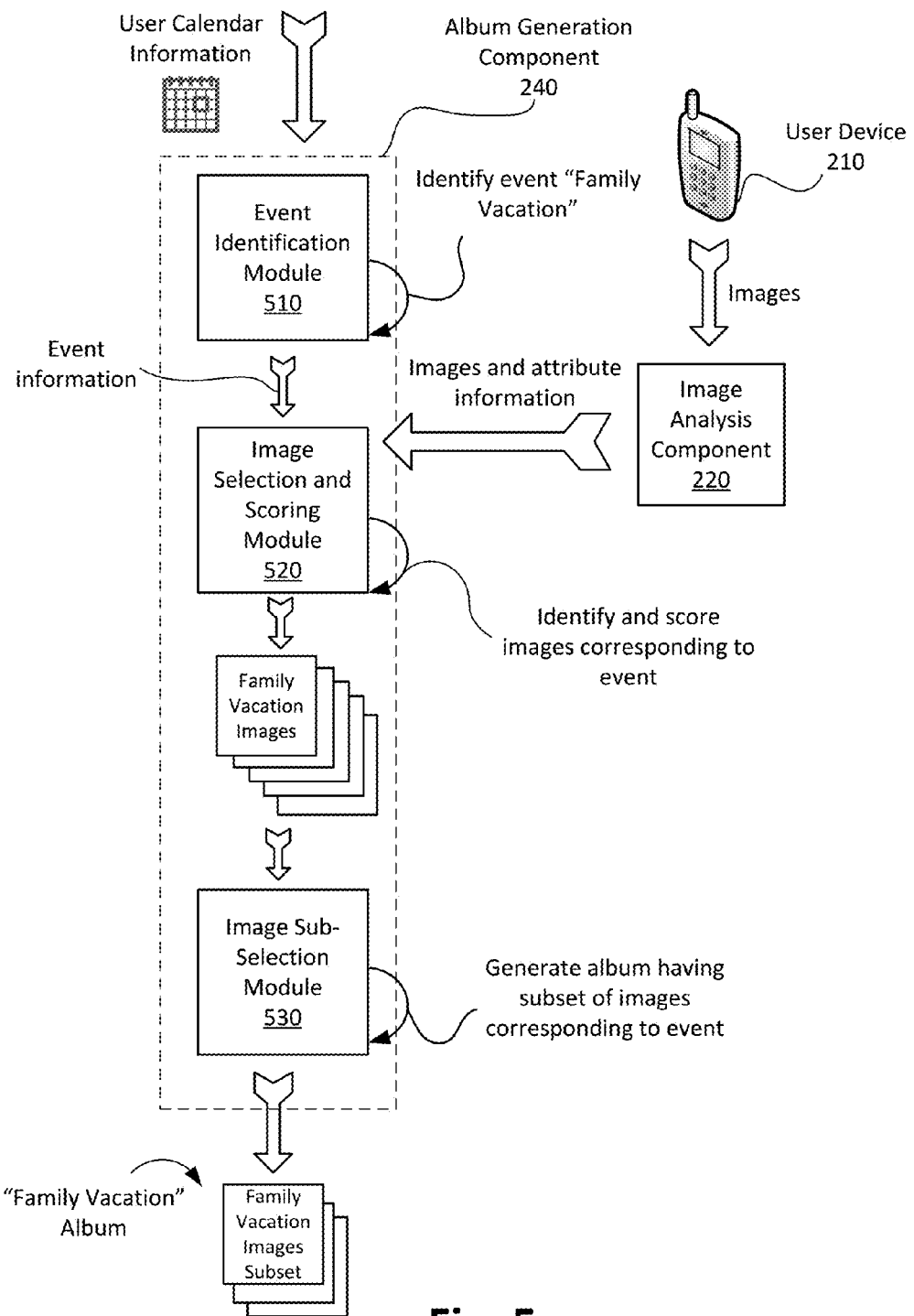
FIG. 5 illustrates an example implementation for automatically generating an album associated with a particular event.

FIG. 5 illustrates an example implementation for automatically generating an album associated with a particular event. As shown in FIG. 5, album generation component 240 may include event identification module 510, image selection and scoring module 520, and image sub-selection module 530. As further shown in FIG. 5, album generation component 240 may receive (e.g., from user information server 230), user calendar information. For example, event identification module 510 may receive the user calendar information. Based on receiving the user calendar information, event identification module 510 may identify the event "Family Vacation." Event identification module 510 may also identify attributes of the event (e.g., a geographic location associated with the event, dates associated with the event, etc.). Event identification module 510 may output the event information to image selection and scoring module 520.

Image selection and scoring module 520 may receive images and image attribute information from image analysis component 220. For example, image analysis component 220 may output the images and the image attribute information based on receiving the images from user device 210. Based on receiving the images and image attribute information, image selection and scoring module 520 may identify images corresponding to the event (e.g., based on the event attributes and the image attributes). Further, image selection and scoring module 520 may score the identified images. Image selection and scoring module 520 may output the identified images and information regarding the scores of the images to image sub-selection module 530. Image sub-selection module 530 may generate an album having a subset of the identified images. For example, image sub-selection module 530 may select a subset of the identified images that exceed a threshold score. Image sub-selection module 530 may output the album, including the subset of the images. In some implementations, album generation component may output images associated with an event without scoring the images or selecting a subset of the images.

Figure 6:
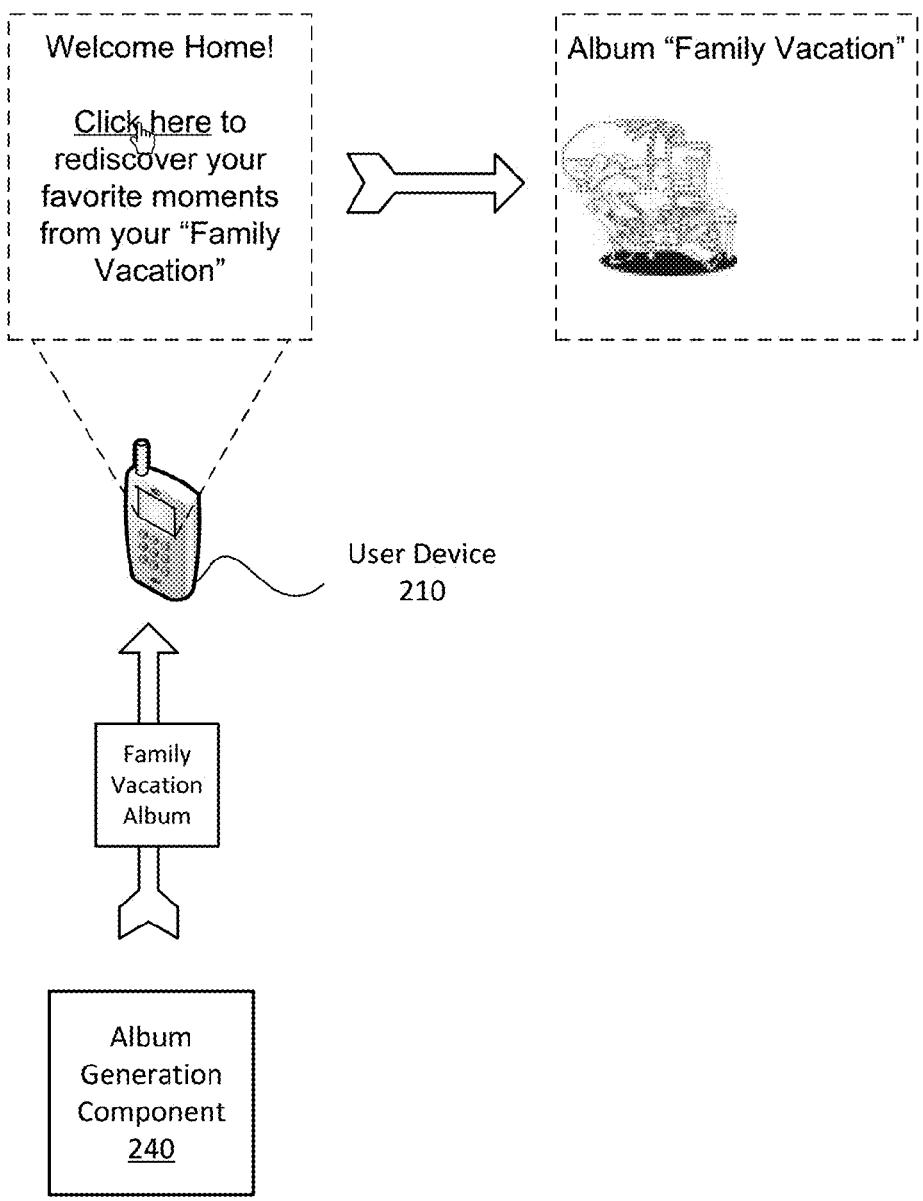
FIG. 6 illustrates an example implementation for displaying an automatically generated album associated with a particular event.

FIG. 6 illustrates an example implementation for displaying an album associated with a particular event. As shown in FIG. 6, album generation component 240 may output an album to user device 210 (e.g., the album entitled "Family Vacation Album"). For example, album generation component 240 may output the album in the form of a message having a link to the album. User device 210 may receive the message, and may display the message. User device 210 may receive a selection of a link associated with the album, and display the album associated with the link. As a result, images associated with a particular event may be organized and viewed without requiring a user of user device 210 to manually sort through and select images associated with the event.

Figure 7:
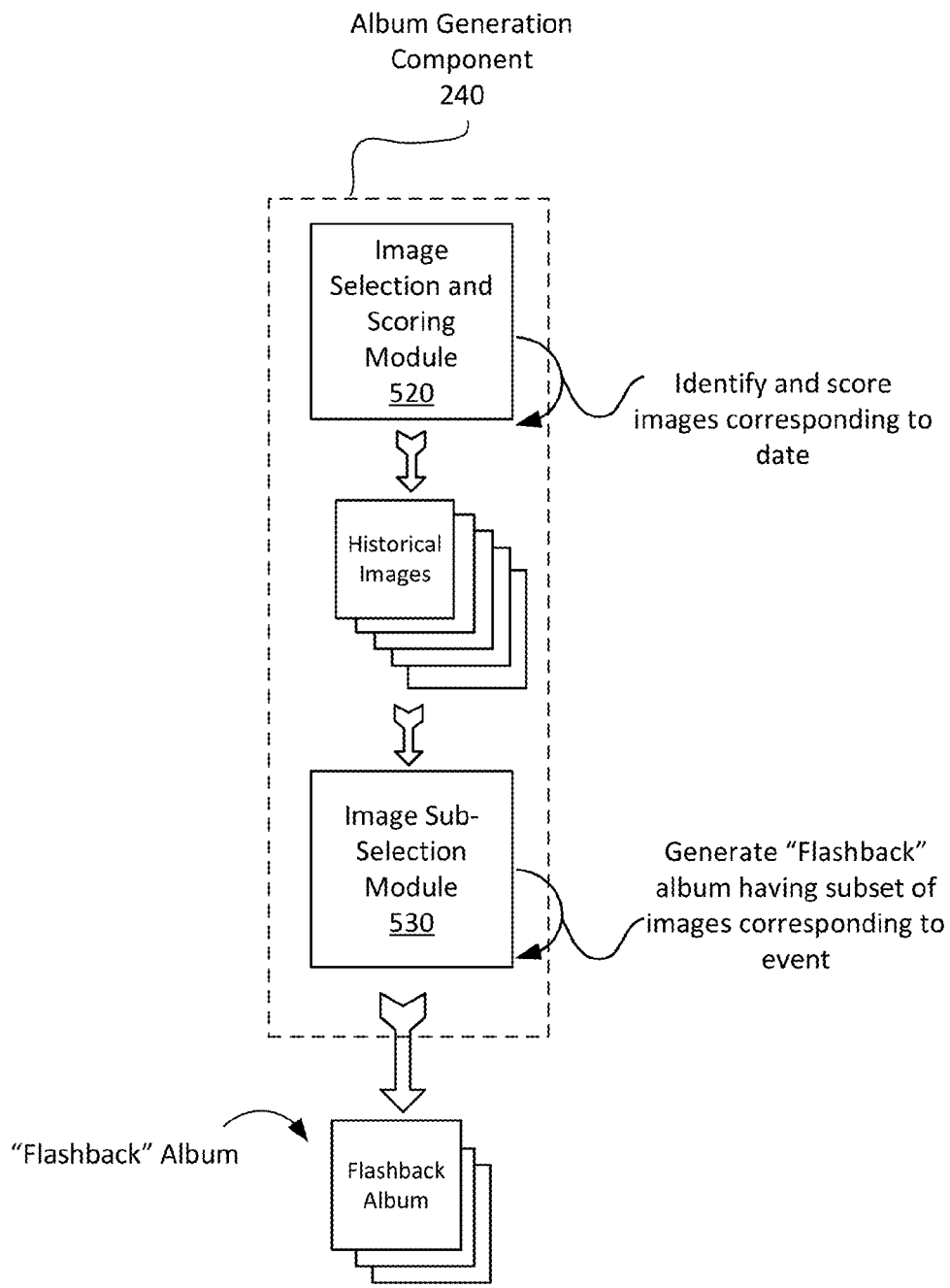
FIG. 7 illustrates an example implementation for automatically generating a "flashback" album.

FIG. 7 illustrates an example implementation for automatically generating a "flashback" album. In FIG. 7, assume that album generation component 240 has previously stored images associated with a user. Further, assume that album generation component 240 has stored attribute information for the images. Given these assumptions, image selection and scoring module 520 may identify image corresponding to a current date. For example, on Jun. 1, 2014, image selection and scoring module 520 may identify images having metadata identifying that the images were captured on June 1 of previous years (e.g., images captured on Jun. 1, 2013, Jun. 1, 2012, etc.). Additionally, or alternatively, image selection and scoring module 520 may identify images that were captured a particular number of days, weeks, months, or years prior to Jun. 1, 2014. Image selection and scoring module 520 may score the identified images, and output the images and information regarding the scores of the images to image sub-selection module 530. Image sub-selection module 530 may generate an album having a subset of the identified images. For example, image sub-selection module 530 may select a subset of the identified images that exceed a threshold score.

Image sub-selection module 530 may output the album (e.g., the album entitled "Flashback Album"), including the subset of the images.

Figure 8:
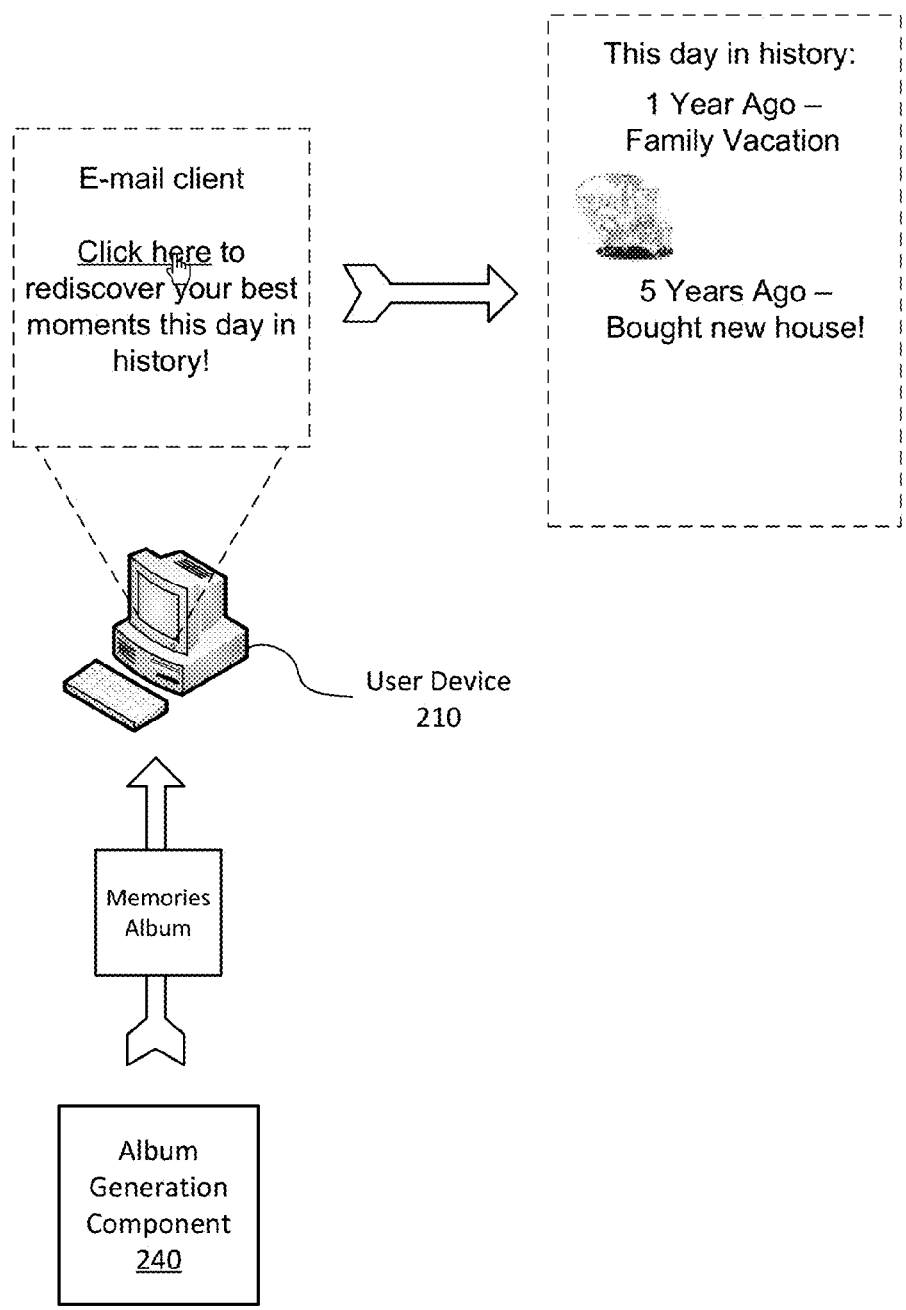
FIG. 8 illustrates an example implementation for displaying a "flashback" album.

FIG. 8 illustrates an example implementation for displaying a "memories" album. As shown in FIG. 8, album generation component 240 may output the "memories" album to user device 210 (e.g., the album entitled "Family Vacation Album"). For example, album generation component 240 may output the album in the form of a message having a link to the album. User device 210 may receive the message, and may display the message. User device 210 may receive a selection of a link associated with the album, and display the album associated with the link. As shown in FIG. 8, the flashback album may include images from a year ago from a current date, such as images corresponding to an event entitled "Family Vacation." Further, the flashback album may include images from five years ago from the current data, such as images corresponding to an event entitled "Bought new house!" In some implementations, images from prior days, weeks, or years, in relation to a current date, may be displayed in the form of a timeline and/or in some other format. In some implementations, events may be identified from the user's calendar, social networking profile, and/or from some other source. Additionally, or alternatively, the user may manually tag an event to a photo.

In some implementations, a notification for the "memories" album may be provided after a user has opted-in to receive notifications for the "memories" album. In some implementations, the notification may include a link to access the album from a web-based client, a desktop computing-based client, or a mobile computing-based client. Further, the user may select the frequency of these notifications (e.g., once a day, once a week once a month, etc.). Also, videos in addition to images may be included in the "memories" album (e.g., videos from a week, a month, a year, or other time prior to a current date). Further, an album may include images and/or videos from a selected date. For example, a user may select a date on a calendar (e.g., a past, current, or future date), and album generation component 240 may identify images and/or videos from prior days, weeks, or years form the selected day. As an example, the user may select (e.g., from a calendar) the date "Dec. 25, 2014," and album generation component 240 may identify images from the date "Dec. 25, 2014," and from years prior to this date (e.g., Dec. 25, 2013, Dec. 25, 2012, etc.). If the selected date is a future date, album generation component 240 may identify images from past dates, but not from the selected date.

As described, albums may be automatically and dynamically generated to include photos associated with an identified event. In some implementations, videos may also be included in an automatically generated album. For example, events and/or attributes may be determined based on frame analysis of a video. In some implementations, image analysis component 220 may determine the attributes of a video, such as metadata associated with the video, individuals and/or objects included in the video (e.g., using facial recognition and/or pixel-based classification techniques), color variations, and/or other attributes of the video. In accordance with process 300, videos associated with an event may be identified. Further, videos may be scored based on video attributes, and videos whose scores satisfy a threshold may be included in an album. For example, videos having individuals of family members may be scored relatively higher than those that do not. Additionally, or alternatively, videos having particular objects or color variations may be scored relatively higher than videos having different objects and/or color variations.

Figure 9:
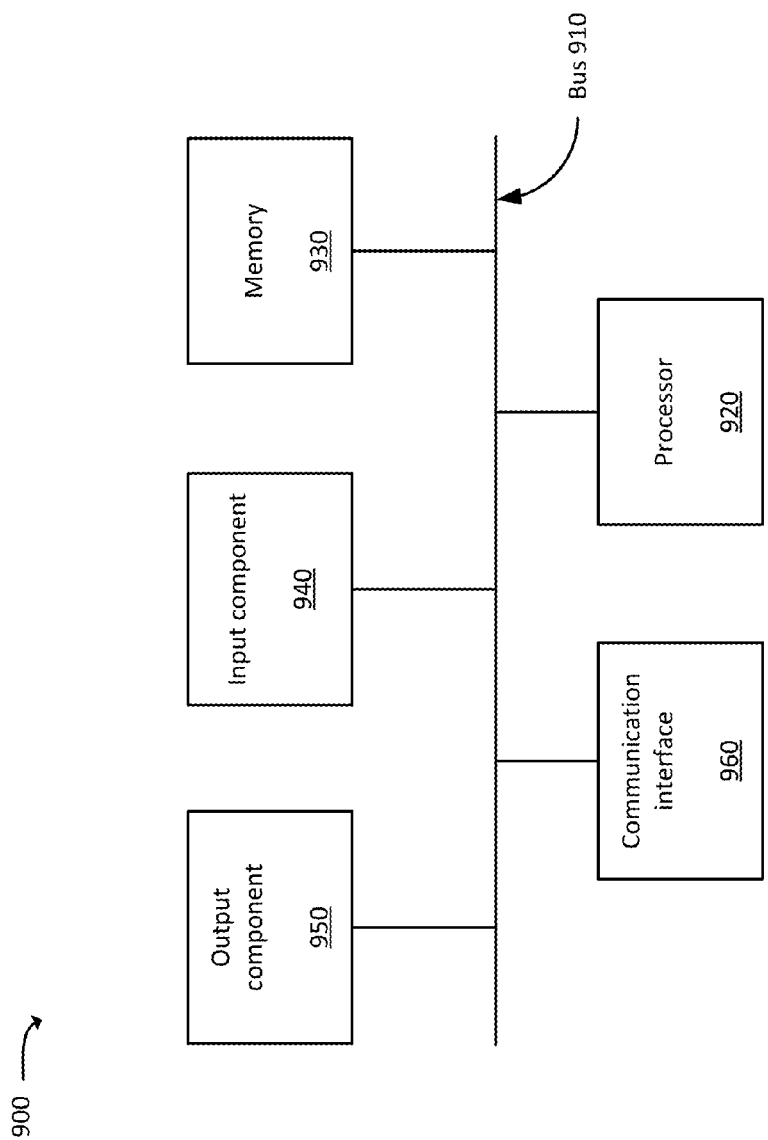
FIG. 9 illustrates example components of one or more devices, according to one or more implementations described herein.

FIG. 9 is a diagram of example components of device 900. One or more of the devices described above (e.g., with respect to FIGS. 1, 2, and 5-8) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIG. 3, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1, 2, and 5-8), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms) as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving, by a device, a plurality of images captured by a user device;
   determining, by the device, an event based on at least one of:
      attributes of the plurality of images, wherein the attributes of a particular image, of the plurality of images, include at least one of:
         information identifying text pictured in the particular image,
         information identifying an individual pictured in the particular image,
         information identifying an object or landmark pictured in the particular image,
         information identifying a geographic location associated with the particular image,
         information identifying a date or a time when the particular image was captured,
         information identifying whether the particular image includes duplicate content of another image,
         information identifying a measure of blurriness of the particular image,
         information identifying whether the particular image has been edited,
         information identifying a type of camera used to capture the particular image,
         object recognition information associated with the particular image, or
         metadata associated with the particular image,
      information regarding a user associated with the plurality of images, or
      information regarding the user device;
   determining, by the device, attributes of the event;
   identifying, by the device and based on the attributes of the plurality of the images and the attributes of the event, particular images, of the plurality of images, associated with the event;
   generating, by the device, a digital image album that includes one or more of the particular images; and
   outputting, by the device, the digital image album.

2. The method of claim 1, wherein determining the event includes determining the event based on at least one of:
   the attributes of the plurality of images,
   the information regarding a user associated with the images, or
   the information regarding the user device.

3. The method of claim 1, wherein the one or more particular images are selected based on:
   scores for each of the one or more particular images, the scores being based on attributes of the one or more particular images.

4. The method of claim 1, wherein the information regarding the user associated with the plurality of images includes at least one of:
   calendar information associated with the user, or
   messaging activity of the user indicating the event.

5. The method of claim 1, wherein the information regarding the user device includes one of:
   calling activity associated with the user device, or
   messaging activity associated with the user device.

6. The method of claim 1, wherein determining the attributes of event include determining at least one of:
   a title of the event,
   a start date or time of the event,
   an end date or time of the event, or
   a geographic location associated with the event.

7. The method of claim 1, wherein determining the event includes determining the event based on a current date, wherein identifying the particular images includes identifying images captured a week, a month, or a year prior to the current date.

8. A system comprising:
a non-transitory memory device storing:
  a plurality of processor-executable instructions; and
a processor configured to execute the processor-executable instructions, wherein executing the processor-executable instructions causes the processor to:
  receive a plurality of images captured by a user device;
  determine an event based on at least one of:
    attributes of the plurality of images, wherein the attributes of a particular image, of the plurality of images, include at least one of:
      information identifying text pictured in the particular image,
      information identifying an individual pictured in the particular image,
      information identifying an object or landmark pictured in the particular image,
      information identifying a geographic location associated with the particular image,
      information identifying a date or a time when the particular image was captured,
      information identifying whether the particular image includes duplicate content of another image,
      information identifying a measure of blurriness of the particular image,
      information identifying whether the particular image has been edited
      information identifying a type of camera used to capture the particular image,
      object recognition information associated with the particular image, or
      metadata associated with the particular image,
    information regarding a user associated with the plurality of images, or
    information regarding the user device;
  determine attributes of the event;
  identify, based on the attributes of the plurality of the images and the attributes of the event, particular images, of the plurality of images, associated with the event;
  generate a digital image album that includes one or more of the particular images; and
  output the digital image album.

9. The system of claim 8, wherein executing the processor-executable instructions, to determine the event, causes the processor to determine the event based on at least one of:
  the attributes of the plurality of images,
  the information regarding a user associated with the images, or
  the information regarding the user device.

10. The system of claim 8, wherein the one or more images are selected based on:
  scores for each of the one or more images, the scores being based on attributes of the one or more particular images.

11. The system of claim 8, wherein the information regarding the user associated with the plurality of images includes at least one of:
  calendar information associated with the user, or
  messaging activity of the user indicating the event.

12. The system of claim 8, wherein the information regarding the user device includes one of:
  calling activity associated with the user device, or
  messaging activity associated with the user device.

13. The system of claim 8, wherein executing the processor-executable instructions, to determine the attributes of event, causes the processor to determine at least one of:
  a title of the event,
  a start date or time of the event,
  an end date or time of the event, or
  a geographic location associated with the event.

14. The system of claim 8, wherein executing the processor-executable instructions, to determine the event, causes the processor to determine the event based on a current date,
  wherein executing the processor-executable instructions, to identify the particular images, causes the processor to identify images captured a week, a month, or a year prior to the current date.

15. A non-transitory computer-readable medium, storing:
a plurality of instructions which, when executed by one or more processors associated with a device, cause the one or more processors to:
  receive a plurality of images captured by a user device, wherein attributes of a particular image, of the plurality of images, include at least one of:
    information identifying text pictured in the particular image,
    information identifying an individual pictured in the particular image,
    information identifying an object or landmark pictured in the particular image,
    information identifying a geographic location associated with the particular image,
    information identifying a date or a time when the particular image was captured,
    information identifying whether the particular image includes duplicate content of another image,
    information identifying a measure of blurriness of the particular image,
    information identifying whether the particular image has been edited,
    information identifying a type of camera used to capture the particular image,
    object recognition information associated with the particular image, or
    metadata associated with the particular image;
  identify, on a particular date, particular images, of the plurality of images, captured in a previous year and on a same day as the particular date;
  generate a digital image album including the particular images; and
  output the digital image album.

16. The non-transitory computer-readable medium of claim 15, wherein one or more instructions, of the plurality of instructions, to output the digital album, causes the one or more processor to output the digital album as a link to one or more of the particular images, or as a link to a page with thumbnails of the one or more of the particular images.

17. The non-transitory computer-readable medium of claim 15, wherein the one or more images are selected based on:
  scores for each of the one or more images, the scores being based on attributes of the one or more particular images.

18. The non-transitory computer-readable medium of claim 15, wherein the information regarding the user associated with the plurality of images includes at least one of:
  calendar information associated with the user, or
  messaging activity of the user indicating the event.

19. The non-transitory computer-readable medium of claim 15, wherein the information regarding the user device includes one of:

calling activity associated with the user device, or
messaging activity associated with the user device.

20. The non-transitory computer-readable medium of claim 15, wherein the instructions, to determine the attributes of event, further include instructions to determine at least one of:
   a title of the event,
   a start date or time of the event,
   an end date or time of the event, or
   a geographic location associated with the event.

* * * * *